(12) United States Patent
Paare et al.

(10) Patent No.: US 12,358,449 B2
(45) Date of Patent: Jul. 15, 2025

(54) BUMPER ARRANGEMENT FOR A MOTOR VEHICLE

(71) Applicant: BENTELER AUTOMOBILTECHNIK GMBH, Paderborn (DE)

(72) Inventors: Mirko Paare, Paderborn (DE); Elmar Mollemeier, Delbrueck (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 245 days.

(21) Appl. No.: 17/681,534

(22) Filed: Feb. 25, 2022

(65) Prior Publication Data
US 2022/0274553 A1  Sep. 1, 2022

(30) Foreign Application Priority Data
Feb. 26, 2021 (EP) .................................. 21159661

(51) Int. Cl.
*B60R 19/18* (2006.01)
*B60R 19/34* (2006.01)
*B60R 19/44* (2006.01)

(52) U.S. Cl.
CPC .............. *B60R 19/18* (2013.01); *B60R 19/34* (2013.01); *B60R 19/44* (2013.01)

(58) Field of Classification Search
CPC ......... B60R 19/26; B60R 19/04; B60R 19/52; B60R 19/34; B60R 19/023; B60R 2019/1813; B60R 19/18; B60R 19/12; B60R 2019/1806; B50R 19/44
USPC .................................................. 293/150, 154
See application file for complete search history.

(56) References Cited

U.S. PATENT DOCUMENTS

| | | | |
|---|---|---|---|
| 9,452,724 B2 * | 9/2016 | Nilsson ................... | B60R 19/44 |
| 10,870,403 B2 | 12/2020 | Lattorff et al. | |
| 11,148,623 B2 | 10/2021 | Guenther et al. | |
| 2010/0176610 A1 | 7/2010 | Roll et al. | |

FOREIGN PATENT DOCUMENTS

| | | | | |
|---|---|---|---|---|
| DE | 10223674 A1 | 12/2003 | | |
| DE | 102009004827 A1 | 7/2010 | | |
| DE | 102014009979 A1 * | 1/2015 | ............. | B60D 1/488 |
| DE | 102017222081 A1 | 6/2019 | | |
| DE | 102019120327 A1 | 1/2021 | | |
| DE | 202020005403 U1 | 2/2021 | | |
| EP | 3668758 B1 | 10/2020 | | |

(Continued)

OTHER PUBLICATIONS

DE-102014009979-A1 computer translation (Year: 2015).*
(Continued)

*Primary Examiner* — Gregory A Blankenship
(74) *Attorney, Agent, or Firm* — HAUPTMAN HAM, LLP (57) ABSTRACT

A bumper arrangement for a motor vehicle has a crossmember and crash boxes which are arranged in each case at the end of the crossmember, and also outer end modules. Each end module has a shell body and a shield which covers the front side of the shell body at least in certain regions, wherein the shell body is joined to a crash box, and an end of the crossmember is joined to a respective shell body. The bumper arrangement has a functionally high energy absorption capacity with a modularized design.

17 Claims, 6 Drawing Sheets

(56) References Cited

FOREIGN PATENT DOCUMENTS

| | | |
|---|---|---|
| KR | 20150069968 A | 6/2015 |
| WO | 2019025163 A1 | 2/2019 |

OTHER PUBLICATIONS

Office Action for European Application No. 21159661.4 mailed May 14, 2021; 12pp.

Office Action for Chinese Application No. 202210183401.X mailed Apr. 27, 2024; 21pp.

European Patent Office, Communication pursuant to Article 94(3) EPC for European Application No. 21159661.4 dated Jul. 3, 2024, 8 pp.

European Patent Office, Communication pursuant to Article 94(3) EPC for European Application No. 21159661.4 dated Oct. 8, 2024, 10 pp.

\* cited by examiner

BUMPER ARRANGEMENT FOR A MOTOR VEHICLE

RELATED APPLICATIONS

The present application claims priority of European Application Number 21 159 661.4 filed Feb. 26, 2021, the disclosure of which is hereby incorporated by reference herein in its entirety.

FIELD

The disclosure relates to a bumper arrangement for a motor vehicle.

BACKGROUND

Bumper arrangements are installed as standard in motor vehicles both at the front and at the rear end, in order to absorb the crash energy of impacts so that the supporting structure of the motor vehicle is not damaged to the greatest possible extent. Bumper arrangements of customary construction have a crossmember which, with the integration of crash boxes, are able to be fixed transversely with respect to the longitudinal members of a motor vehicle frame. The crossmember is used to introduce the energy resulting from an impact into the crash boxes, where the impact energy is intended to be converted into deformation work. In this case, the system is coordinated such that the crash boxes each sit as centrally as possible on the longitudinal members, and the impact energy is introduced into the crash boxes, and thus onto the longitudinal members, via the crossmembers with as small a bending moment as possible. However, in most head-on collisions, the impact takes place in an offset manner and only in a specific region of the vehicle front, that is to say not over the entire width.

EP 3 668 758 B1 discloses a bumper crossmember for a vehicle, said crossmember being composed of an outer shell and an inner shell connected to the outer shell.

DE 10 2019 120 327 A1 discloses a bumper crossmember for a motor vehicle, said crossmember being composed of two shells and having, in its center, a passage which divides the crossmember into an upper hollow chamber portion and a lower hollow chamber portion. The crossmember is supported on the vehicle side via crash boxes. The bumper crossmember has a second crossmember which is arranged below the lower hollow chamber portion and to which crash boxes are also connected.

Motor vehicle bumpers or bumper arrangements have to comply with the legal regulations as well as the requirements stipulated by consumer protection organizations with regard to pedestrian protection. In addition, the requirements from the various classification tests of insurance companies (RCAR, GDV) have to be complied with. At the same time, automotive manufacturers stipulate the vehicle-specific requirements for optimum use of structural space, a high energy absorption capacity with the lowest possible weight and acceptable costs and good assemblability. The implementation of the requirements that are sometimes difficult to comply with is a correspondingly great challenge.

SUMMARY

The present disclosure addresses the problem of providing a functionally improved motor vehicle bumper arrangement which, with a cost-saving and weight-saving construction, ensures advantageous loading characteristics and a high energy absorption capacity with a modularized design.

Expressions such as transversely and longitudinally, at the top and at the bottom, horizontally and vertically or longitudinal direction and transverse direction and top side and underside, vehicle side, on the vehicle side relate to the installation position of the bumper arrangement in the motor vehicle.

The motor vehicle bumper arrangement has a crossmember and crash boxes which are arranged in each case at the end of the crossmember, and also outer end modules. According to the disclosure, each end module comprises a shell body. The shell body is joined to a respective crash box, whereas a respective end of the crossmember is joined to the shell body.

A shield which covers the front side of the shell body at least in certain regions is provided. The shield together with the shell body forms an end module. The advantageous deformation characteristics of an end module are assisted by the respectively connected crash box.

The bumper arrangement has a design composed of component parts or modules. The individual component parts are cost-effective to produce with a weight-saving construction. Overall, the design is suitable for cross-platform use. The bumper arrangement is able to be adapted to different vehicles of a model series. This is effected by adaptation of components or component elements of the bumper arrangement and the vehicle-specific scaling thereof.

The impact forces are effectively conducted to parts of the motor vehicle where the energy is able to be absorbed in an efficient and safe manner. The crumple zone of the vehicle front collapses in a controlled manner, while the passenger compartment remains non-deformed to the greatest possible extent. Vehicle occupants are subjected to no, or a considerably reduced, dangerous deceleration. The rearward movement of steering wheel and pedals is also limited, as a result of which serious injuries are able to be avoided.

The bumper arrangement according to the disclosure has a high energy absorption capacity with deformation characteristics that are designed in a vehicle-specific manner in accordance with the requirements. The geometrical configuration of the components, which complement each other in a modular manner, of crossmember, crash boxes and of the end modules designed according to the disclosure result in a functionally improved motor vehicle bumper arrangement. The bumper arrangement has deformation characteristics, for example, in the case of an impact against a stationary obstacle such as a tree or a post as well as in the case of an offset impact and a collision with a laterally moving obstacle. The motor vehicle bumper arrangement according to the disclosure permits a reduction in weight compared with known systems, specifically with comparably good or better crash performance.

The shield completely covers the front side of the shell body. The shell body is able to have outer wall portions, for example, lower or lateral wall portions, which extend beyond the contour of the shield. The wall portions run parallel to the shield but are not covered by the shield in certain regions. Openings or apertures and/or passages are able to be provided in the shield.

The shield acts together with the crossmember, for example, together with the closing panel arranged on the front side on the crossmember, as an impact surface and, in this way, contributes to the improved crash performance of the bumper arrangement according to the disclosure. In compatibility crash tests using what is known as an MPDB (mobile progressive deformable barrier) barrier, a good or low maximum deformation or penetration values are able to be achieved.

The crossmember extends between the inner side walls of the crash boxes in a y direction of the motor vehicle.

A vehicle coordinate system indicates the axes within a motor vehicle. The x axis corresponds to the vehicle longitudinal axis, the y axis corresponds to the vehicle transverse axis and the z axis corresponds to the vehicle vertical axis.

An advantageous embodiment of the crossmember provides that said crossmember has a U-shaped or hat-shaped strut profile and a closing panel.

The crossmember has a front side, wherein the front side is covered by a closing panel. A configuration that is advantageous in practice provides that the closing panel arranged on the front side of the crossmember is shorter than the front side. Front-side portions at the ends of the crossmember are not covered by the closing panel which extends over the length of the crossmember.

The base region of a shell body has a vertical cross-sectional area. The vertical cross-sectional area extends in a y-z plane. A mean vertical cross-sectional area of the shell body is able to be ascertained by way of the mean value of the cross-sectional area in the y-z plane directly adjacent on the inside to the bottom wall of the shell body and of the cross-sectional area in the y-z plane directly at the open outer surface of the shell body. The mean cross-sectional area is at least twice as great as the mean cross-sectional area of a crash box. The mean vertical cross-sectional area of a crash box is able to be ascertained by way of the mean value of the vertical cross-sectional area at the start of the crash box on the vehicle side and at the end of a crash box on the shell body side. The area ratio of the mean vertical cross-sectional area of the shell body in the base region to the mean vertical cross-sectional area of the crash box is at least 2:1, and is greater. The ratio is 2.5:1 to 3.5:1, about 3:1. All the aforementioned ratios include +/−25%.

In this context, one aspect provides that the shield covers or overlaps the front side of the crossmember in certain regions. The shield extends over the front-side portions of the crossmember that are not covered by the closing panel. The shield is able to be joined to the crossmember in the overlap region.

Each end module has a front portion which is arranged in front of the crash box and which is laterally adjoined, at a height level below the crash box, by a transition portion which transitions into a side portion.

The transition portion is of arcuate and/or curved design or configuration and runs downward and in the direction toward the vehicle longitudinal side.

A furthermore advantageous embodiment of an end module provides that the shell body has a bottom wall, and the shell body is supported on a crash box by way of the bottom wall. The shell body as such is configured in the manner of an impact pad in the front portion. In this way, a double-acting absorption zone is formed by arranging the end module and its front portion, which is arranged in front of a crash box, the shell body and the crash box in series.

In the support region, the crash box is joined to the bottom wall on the rear side thereof, for example, is joined in a materially bonded manner by means of material-bond elements such as welds.

At least one embodiment provides that the shell body has a connection contour to which the end of the crossmember is connected. The configuration of the connection contour is matched to the contour of the ends of the crossmember. The connection contour is able to be designed to engage around the end of the crossmember on the rear wall thereof and the two lateral limbs. Furthermore, the connection contour is able to be designed in the form of a connection piece, wherein the connection piece engages into an end of the crossmember so as to orientate the position of, and retain, said end, or also be a support tab contour which accommodates the end of the crossmember on the inner and outer side.

A respective end of the crossmember at least partially engages in a form-fitting manner into the connection contour and is joined to the shell body.

According to the disclosure, form-fitting in this context means that there is a geometrical undercut between the crossmember and the shell body in the direction of the central longitudinal axis or the y axis.

The form-fitting connection between the end of the crossmember and the connection contour in or on the shell body retains the components in the x axis, y axis and z axis, that is to say in three planes.

In an advantageous configuration, the shell body has a base region arranged in front of a crash box, and a skirt portion adjoining the base region. The skirt portion extends outward at a height level below the crash boxes. The shell contour of the shell body runs over from the base region into the skirt portion, which has a channel-like profile, in a hollowed manner. The transition between base region and skirt portion runs in an arcuate and curved manner downward and in the direction toward the vehicle longitudinal side, that is to say toward the outer side of a vehicle. In vertical cross section, the skirt portion has a channel form hollowed in a U-shaped manner with the shell contour formed by the bottom wall and the side walls. The skirt portion of the shell body, and correspondingly the side portion of an end module, runs from the front portion of the end module in the direction of the vehicle side wall and, here, for example, in the direction of the wheel arch, approximately in the direction of the midpoint of the height of the vehicle wheel.

In the base region, the shell body is at least twice as great or high as the crossmember. The height is measured along the z axis, in each case between the points of the shell body which lie furthest away from one another on the upper and lower side walls of the base region and of the crossmember. An advantageous ratio of the height of the shell body to the height of the crossmember is 2:1 to 4:1, in each case +/−25%.

Each end of the crossmember or the respective end portion at the end of the crossmember is able to extend within the shell body, wherein the end or the end portion of the crossmember extends into the region in front of a crash box. The bottom wall of the shell body is located between the end of the crossmember and the crash box. The front side of the shell body is covered by the shield. The end of the crossmember is located behind the shield.

A form-fit connection between the crossmember and the shell body, for example, the strut profile of the crossmember and the shell body, is able to be implemented by means of a clamp element or a hook element, for example a lug-like turned-over portion or clamping tab, in each case on an end side at an end of the strut profile. Such a form-fit element is formed out of the plane of the rear wall of the strut profile and engages through an orifice in the shell body or engages into a counterpart receptacle on a shell body of the end module. A configuration that is advantageous in practice provides a wedge connection between the end of a crossmember and the shell body, in the case of which oblique surfaces are supported against one another so that the component partners are joined in a force-fitting and form-fitting manner. In the case of deformation-induced tensile loading of the crossmember in the y direction, shell body and crossmember interact by means of the connection contour and the end of the crossmember that is accommodated therein in a form-fitting and force-fitting manner.

The end side of the crash box is bale to have a stepped support contour which interacts with a counterpart support contour on the shell body. The horizontal and/or vertical end walls of the crash box that are directed forward toward the shell body of the end module have a step or a similarly designed support contour. A counterpart support contour, which is designed to be complementary to the support contour, on the shell body bears against the support contour. The crash box and the shell body are joined to one another in a materially bonded manner.

An aspect that is advantageous in practice provides that a tow hook connection is provided within a crash box or in the region adjacent to a crash box and the front portion of an end module. A threaded sleeve of the tow hook connection extends through the shield and/or the shell body and is joined to at least one of the component parts, to both of them.

The bumper arrangement and the components thereof are composed of sheet steel. Ultra-high-strength cold-formed steels are able to be used for the crossmember as well as for the crash boxes, the shell bodies and/or the shields or closing panels. The components are able to be embodied as hot-formed and press-hardened steel components. The shell bodies of the end modules are able to be hot-formed and press-hardened, whereas the shields are composed of ultra-high-strength cold-formed steel. Equally, the crossmember or the strut profile thereof and the closing panel are able to be hot-formed and press-hardened steel components. A combination of components made of hot-formed and press-hardened steel with components made of cold-formed steels is also advantageous. The strut profile of the crossmember is a hot-formed and press-hardened steel component, whereas the closing panel provided on the front side is composed of a cold-formed steel, for example, an ultra-high-strength cold-formed steel.

The shell bodies have a tensile strength Rm of greater than or equal to (≥) 1,350 MPa. The upper limit of the tensile strength lies at the values known to those skilled in the art of UHSS (ultra-high-strength steel) steels or AHSS (advanced high-strength steel) steels.

Even if an advantageous configuration of the crossmember provides that said crossmember has a U-shaped or hat-shaped strut profile which is open toward the front side and which is closed by a closing panel or closed at least over the predominant part of its length, the crossmember also is able to have a closed hollow profile or be roll-formed. The crossmember likewise has a tensile strength Rm of greater than or equal to (≥) 1,350 MPa.

An advantageous embodiment of a shell body provides that said shell body has a bead, a fold and/or a turned-over portion in edge-side wall portions. Such beads, folds or turned-over portions extend along edge-side wall portions of the shell body. The shaped portions have a stiffening function. Furthermore, they are able to form functional surfaces along the edge-side wall portions, where the front-side shields are supported or the end portions or the ends of the crossmember are connected.

A further inventive aspect provides that the components of the bumper arrangement, that is to say the crossmember or the strut profile and the closing panel of the crossmember and also the end modules or the shell bodies and the shields, are joined to one another in their respective joining regions by means of a combined joining technique. Here, use is made of a combination of material-bond elements, welded connections, and form-fit elements such as wedge bodies and wedge surfaces, embossed portions, clinched portions or interlocking portions. The screw or bolt connections are able to be used on their own or in a combined joining technique for the join between component elements.

The crash performance is able to be further improved if a transverse beam and/or at least a support strut are/is arranged below the crossmember. A transverse beam extends in the y direction transversely at a spacing in the z direction below the crossmember. The transverse beam is connected, for example, by means of holders which are fixed in the lower region of the end modules. The transverse beam is able to be supported on a further pair of crash boxes or similarly configured impact absorbers. The transverse beam is connected to the crash boxes in an appropriate manner.

A support strut is able to extend, for example, from a lower region of an end module obliquely in the direction toward the crossmember. Here, a transverse strut is able to be connected to the rear side of a shield. In this way, the system is able to be additionally reinforced in certain regions, which improves the deformation and energy absorption characteristics in the case of a lateral impact in the case of a lateral impact against the bumper arrangement.

The wall thicknesses of the individual components of the bumper arrangement, that is to say of strut profile, closing panel, shell body and shield, are able to be identical or different from one another. The strut profile, the closing panel, the shell bodies or the shields themselves are able to have different wall thicknesses. A wall thickness profile that differs in part allows for predefine target deformation zones. In addition, such configurations contribute to a weight optimization.

BRIEF DESCRIPTION OF THE DRAWINGS

The disclosure is described in more detail below on the basis of exemplary embodiments which are illustrated in the drawings. In the figures.

DETAILED DESCRIPTION

Where expedient, the same reference designations are used for identical or similar components or component elements in FIG. 1-FIG. 11, even if a repeated description is omitted for reasons of simplification.

A first exemplary embodiment of a bumper arrangement 1 according to the disclosure for a motor vehicle is described with reference to FIG. 1-FIG. 5. The bumper arrangement 1 is used in the front or rear region, for example, in the front region of the body of a motor vehicle.

The bumper arrangement 1 has a crossmember 2 which is arranged transversely with respect to the longitudinal members (not illustrated here) of a motor vehicle. The bumper arrangement 1 is supported on the longitudinal members via crash boxes 3, which are provided at the end of the crossmember 2. The crash boxes 3, in addition to the crossmember 2, are intended to absorb the energy resulting from an impact by converting said energy into deformation work.

The crossmember 2 extends between the inner side walls of the crash boxes 3. The crossmember 2 has a U-shaped or hat-shaped strut profile 4 which is formed in one part from a sheet metal, for example, sheet steel. The strut profile 4 has a rear wall 5 with two limbs 6 which are each adjoined at the end by an outwardly directed longitudinal flange 7,8. A closing panel 9 is provided on the front side of the strut profile 4. The closing panel 9 extends in the y direction over virtually the entire length of the front side 10 of the crossmember 2. In the middle length portion 11 of the crossmember 2 (see FIG. 3), the upper longitudinal flange 8 is adjoined by a turned-over portion 12 which is directed rearward in the x direction toward the vehicle. In the middle length portion 11, the closing panel 9 also has a rearwardly directed turned-over portion 13 which overlaps the turned-over portion 12 on the upper longitudinal flange 8 of the strut profile 4. The closing panel 9 bears against the strut profile 4 on the lower longitudinal flange 7 of the strut profile 4 in the middle length region 11 of the crossmember 2.

The bumper arrangement 1 has an end module 14 at each end. Each end module 14 has a shell body 15 and a shield 16 which covers the front side of the shell body 15. The shell body 15 is joined to the crash box 3. An end 17 of the crossmember 2 is joined to the shell body 15. The join between the component elements is effected in a materially bonded manner by means of welding.

Figure 6:
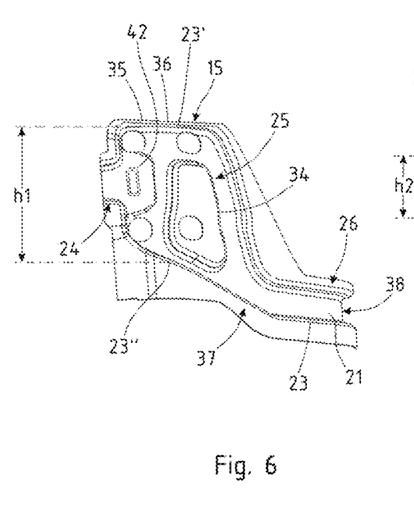
FIG. 6 shows a view of a shell body according to the disclosure.

FIG. 6 shows a view of a shell body 15.

An end module 14 has a front portion 18 which is arranged in front of the crash box 3 and which is laterally adjoined, at a height level below the crash box 3, by a transition portion 19 which transitions into a side portion 20.

The transition portion 19 is of arcuate configuration or runs in a curved manner downward and in the direction toward the vehicle longitudinal side or toward the wheel arch.

The shell body 15 has a bottom wall 21. A crash box 3 is supported in each case on the outer side or on the outer surface of the bottom wall 21 of the shell body 15, said outer surface being directed toward the vehicle. Toward the end portions 22 of the crossmember 2, a shell body 15 has, in its side wall 23 which is directed forward from the bottom wall 21 and which is adjacent to the end 17 of the crossmember 2, a connection contour 24 to which the end of the crossmember 2 is connected.

The shell body 15 has a base region 25 arranged in front of a crash box 3, and a skirt portion 26 adjoining the base region 25. The skirt portion 26 extends outward at a height level below the crash box 3 in the direction toward the vehicle longitudinal sides.

The shell contour of the shell body 15 runs over from the base region 25 into the skirt portion 26, which has a channel-like profile, in a hollowed manner. The transition 37 between base region 25 and skirt portion 26 runs in an arcuate and curved manner downward and in the direction toward the vehicle longitudinal side, that is to say toward the outer side of a vehicle. In vertical cross section, the skirt portion 26 has a channel form 38 recessed in a U-shaped manner with the shell contour formed by the bottom wall 21 and the side walls 23. The channel form 38 runs out in an open manner at the end of the skirt portion 26.

Figure 8:
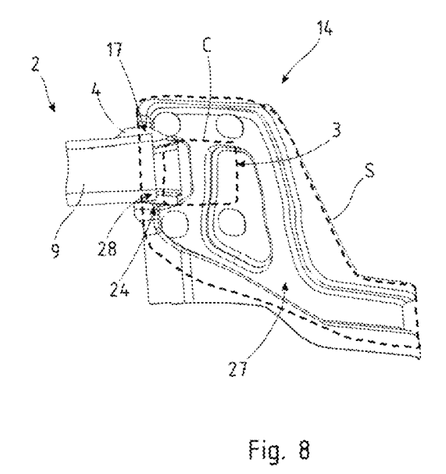
FIG. 8 shows a view of an end module with the technically schematic illustration of the covering contour of a shield and the illustration of the crash box contour according to the disclosure.

The shield 16 is arranged in each case on the front side in front of the shell bodies 15 and is of curved configuration in an arcuate portion 27. The shield 16 is able to overlap the front side of the crossmember 2 in certain regions. FIG. 8 shows such a configuration. The end 17 of the crossmember 2 lies in the connection contour 24 of the shell body 15. The shield 16 covers the front side of the arrangement. Here, the shield 16 bears against parallel surfaces of the shell body 15 in an areal manner and overlaps the end 17 and the closing panel 9 of the crossmember 2 in an overlap region 28.

In one embodiment of a bumper arrangement 1, as explained with reference to FIG. 10, the closing panel 9 is embodied to be shorter than the front side 10 of the crossmember 2 so that short portions 29 on the front side 10 of the crossmember 2 are not covered by the closing panel 9. These front-side portions 29 are covered by the shield 16, the closing panel 9 and the shield 16 bearing against one another in an approximately flush manner in an abutment region.

Figure 7:
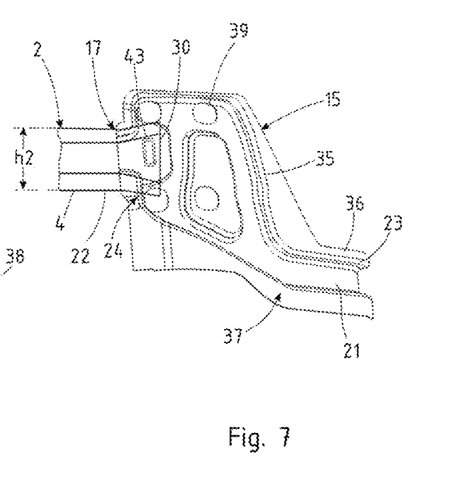
FIG. 7 shows a detail from the lateral region of a bumper arrangement with the illustration of the shell body of an end module and the schematically indicated connection of a crossmember according to the disclosure.

FIG. 7 shows, in a schematically indicated manner, that the end 17 of the crossmember 2 at least partially engages in a form-fitting manner into the connection contour 24. The end 17 is joined to the shell body 15 in the region of the connection contour 24. The end 17 of the crossmember 2 or the end 30 of the strut profile 4 is of trapezoidal configuration. A form-fitting join is effected, which is optionally supplemented by material-bond elements.

In principle, a combined joining technique of parts to be joined is also possible, in the case of which for example the strut profile 4 and the shell body 15 are joined by means of material-bond elements and form-fit elements.

The shell body 15 is formed from a steel sheet, for example, from a manganese-boron-steel sheet. A shell body 15 is hot-formed and press-hardened and has a tensile strength Rm of greater than or equal to ($\geq$) 1,350 MPa.

The shields 16 is able to be hot-formed and press-hardened with comparable material properties. The shields 16 are able to be cold-formed and be composed of ultra-high-strength cold-formed steels.

The strut profile 4 of the crossmember 2 also has a tensile strength Rm of greater than or equal to ($\geq$) 1,350 MPa. The strut profile 4 is hot-formed and press-hardened.

The end 17 of the crossmember 2 and an end-side length portion or the end portion 22 of the crossmember 2 is able to extend into the shell body 15, specifically into a region which lies in front of the crash box 3. FIG. 8 shows such a configuration. The crash box contour is indicated by the dashed line C. The dashed line S illustrates the contour of the closing panel 9. The front side of the end module 14, just like the end-side length portion 22, which projects into the shell body 15, and the end 17 of the crossmember 2, is covered by the shield 16.

Figure 9:
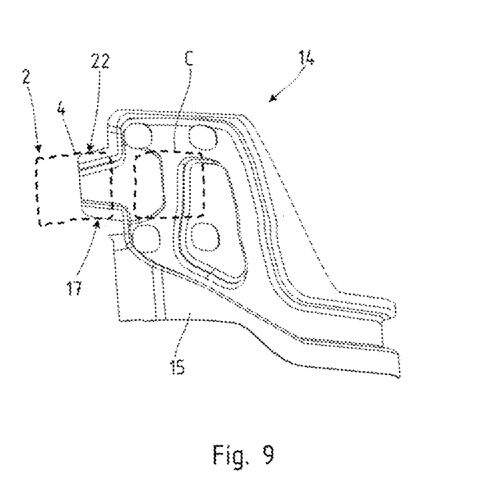
FIG. 9 shows the illustration of a possible modification in the arrangement of the crossmember and the connection thereof to an end module according to the disclosure.

The crash box contour, illustrated by the dashed line C, is able to be seen in the illustration of FIG. 9. The contour of the end 17 of the crossmember 2 is indicated by the dashed line E. The crossmember 2 or that the end 17 of the crossmember 2 does not extend as far as the crash box contour C. The end 17 of the crossmember 2 is connected to the shell body 15, but ends at a spacing in the y direction in front of a crash box 3.

Figure 10:
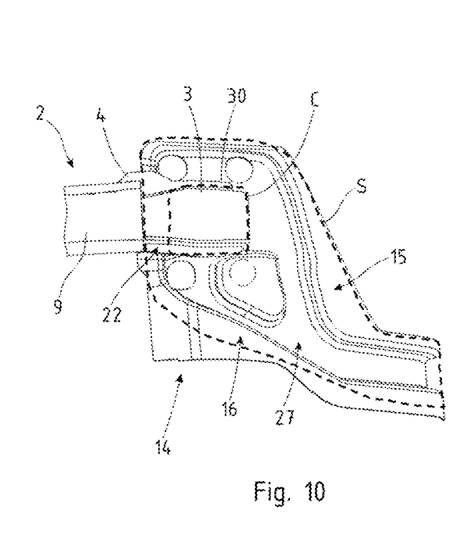
FIG. 10 shows a technically schematic illustration of a further modification of the bumper arrangement according to the disclosure.

In the modification illustrated in FIG. 10, the end 30 of the strut profile 4 of the crossmember 2 extends within the shell body 15 in front of the crash box 3 and goes beyond the total crash box contour C. The closing panel 9 of the crossmember 2 ends in front of the shield 16. However, the closing panel 9 is also able to extend over the end 30 of the strut profile 4, which lies in front of the crash box 3. The bottom wall 21 of the shell body 15 is located on the vehicle side, between the crossmember 2 and the end 17. The front side of the end module 14 or of the shell body 15 is covered by the shield 16.

A crash box 3 has, on the front side, for example, in the front-side vertical end sides 31 oriented in the z axis, a stepped support contour 32 which interacts with a counterpart support contour 33 on the shell body 15. This is illustrated in an indicative manner in the illustration of FIG. 4, and is able to be seen with reference to FIG. 11. The shell body 15 (see FIG. 4 and FIG. 6) has hollow-like embossed portions 34 in its bottom wall 21. The embossed portions 34 are formed in the direction toward the outer side or in the direction toward the shield 16. FIG. 5 also shows such an embossed portion 34 or hollow. The counterpart support contour 33 is formed by the transitions to the embossed portions 34, the support contour 32 being supported on said counterpart support contour.

In edge-side wall portions 35, a shell body 15 has a turned-over portion 36 which has a stiffening function in the edge-side wall portions 35.

Figure 1:
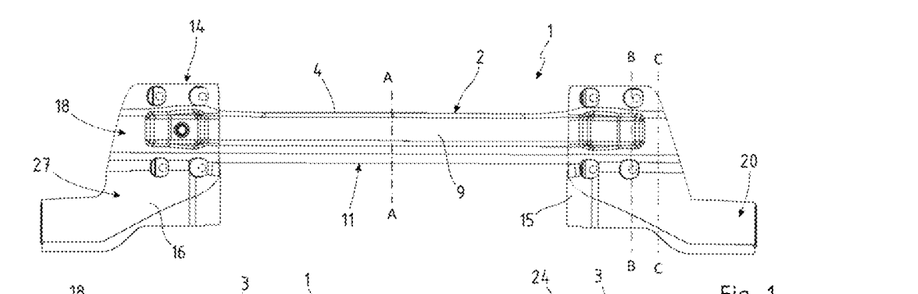
FIG. 1 shows a front view of a motor vehicle bumper arrangement according to the disclosure.
Figure 2:
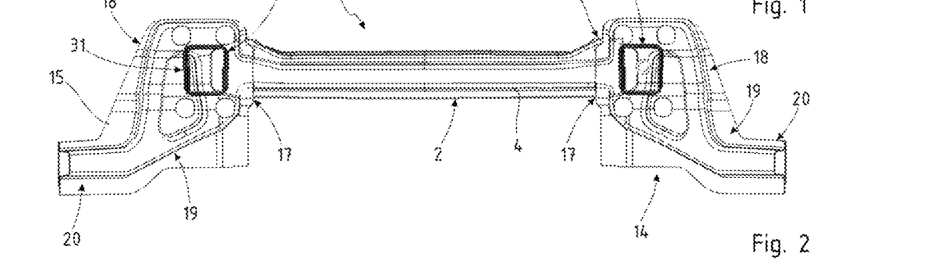
FIG. 2 shows the bumper arrangement in a rear view from the motor vehicle according to the disclosure.
Figure 3:
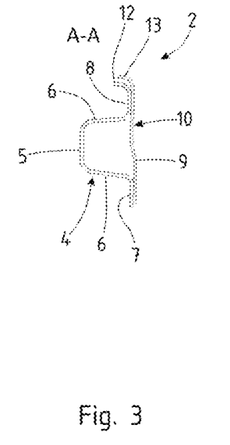
FIG. 3 shows a section through the illustration of FIG. 1 along line A-A according to the disclosure.
Figure 4:
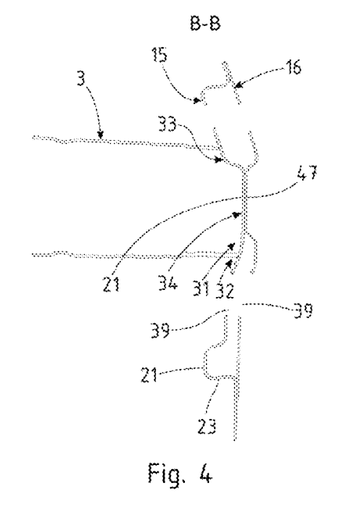
FIG. 4 shows a section through the illustration of FIG. 1 along line B-B according to the disclosure.
Figure 5:
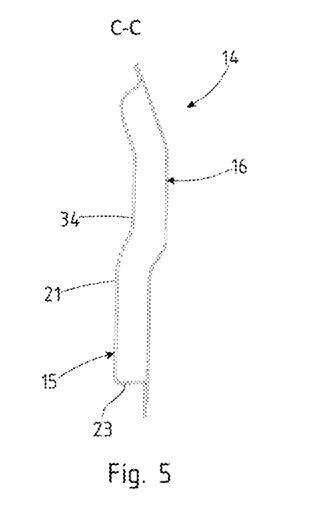
FIG. 5 shows a section through the illustration of FIG. 1 along line C-C according to the disclosure.

Openings 39 or apertures 39 are able to be present both in the shell body 15 and in the shield 16 (see for example FIG. 4 or FIG. 7). The openings 39 are able to be embodied as passages.

Figure 11:
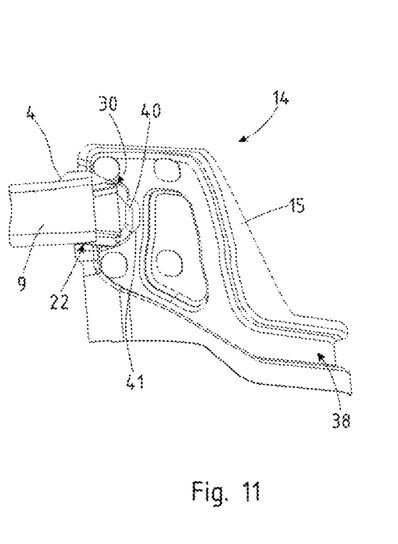
FIG. 11 shows a further modification of the bumper arrangement with the illustration of the shell body of an end module and the end-module-side end of a crossmember according to the disclosure.

In the modification of the bumper arrangement 1 or of the connection and joining of the end 17 of the crossmember 2 or of the end 30 of the strut profile 4, as illustrated in FIG. 11, a clamp-like or hook-like joining element 40 is provided at the end 30. This engages through an abutment element 41 in the shell body 15. The abutment element 41 is able to be an aperture in the bottom wall 21 of the shell body 15. The abutment element 41 is able to be designed in a slot-like manner as well as in the form of an outwardly or inwardly embossed abutment element 41 with a form-fitting action.

In the shell body 15, there is a form-fit element 42 within the connection contour (see FIG. 6). Here, this is able to be a recess or elevation. The form-fit element 42 interacts with a form-fit element 43 of correspondingly complementary design at the end 30 of the strut profile 4 of the crossmember 2. In the form-fit elements 43 is illustrated in FIG. 7, the form-fit elements 43 is provided in the rear wall 5 of the strut profile 4.

FIG. 12 again illustrates the connection and support of a crash box 3 to/on the rear side of the bottom wall 21 of a shell body 15. The end side of the crash box 3 has a stepped support contour 32 having a step 45 formed on a side wall 44 of the crash box 3. The support contour 32 interacts with a counterpart support contour 33 on the shell body 15. The counterpart support contour 33 is formed on an arcuate portion of a hollow or embossed portion 34 of the counterpart support contour 33. Corresponding support contours 32 and counterpart support contours 33 are formed on both sides, that is to say also on the opposite side of the crash box 3 and the side wall 46 provided there.

Figure 12:
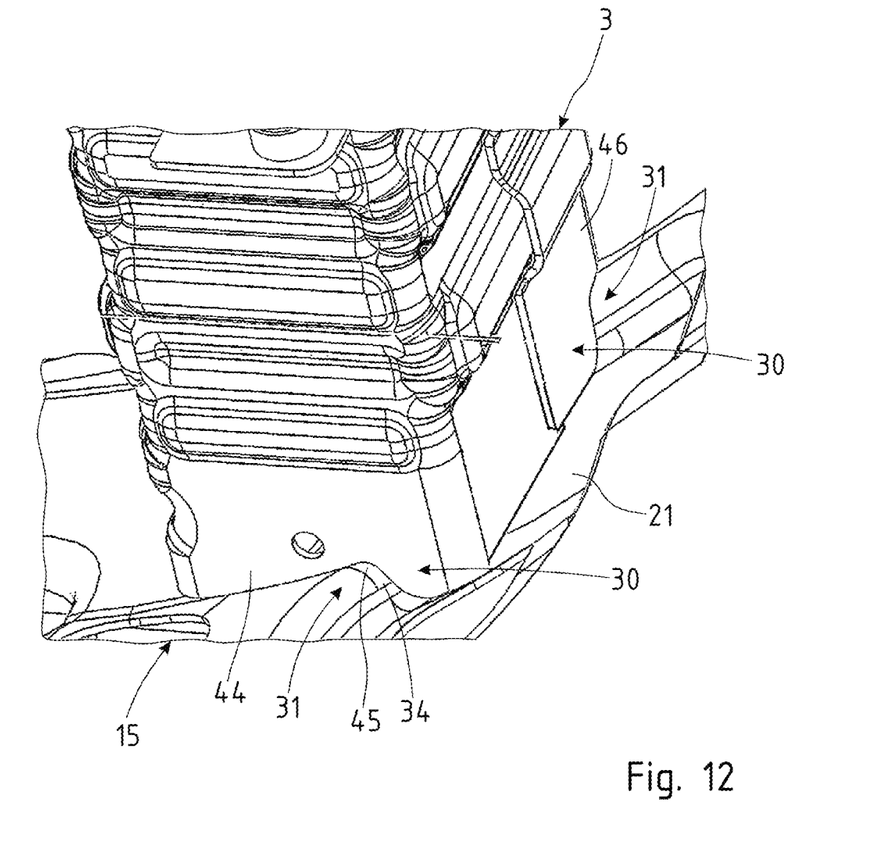
FIG. 12 shows a perspective illustration of a detail from the connection region between a crash box and a shell body according to the disclosure.

In this way, the crash box 3 is retained and stabilized on the shell body 15 in the z axis and in the y axis.

An end module 14 has, in the base region 25 of the shell body 15, a vertical cross-sectional area which is at least twice as great, for example, is a multiple of, the vertical cross-sectional area of a crash box 3. The ratio of the cross-sectional areas of the base region 25 of shell body 15 and crash box 3 to one another is crucial, the vertical cross-sectional ratio of the base region 25 and the vertical cross-sectional ratio of the crash box 3 being at least 2:1, 3:1. The cross-sectional ratio is able to be from 2:1 to 4:1, to 3.5:1, in each case +/−25%.

To ascertain the cross-sectional ratio, account is able to in each case be taken of a mean vertical cross-sectional ratio. Here, the area is able to be ascertained in the region of the bottom wall 21 of the shell body 15, in the center of the base region 25 and on the open outer side. The same applies to a crash box 3. There, the cross-sectional ratio is able to be ascertained at the start, in the center and at the end of the crash box 3, and a mean value is able to be formed from the respective cross-sectional ratios.

In the case of an impact, force or energy is distributed in a large-area manner over the base region 25 of the shell body 15 of an end module 14, said base region being considerably larger in terms of cross section.

The ratio of the height h1, measured along the z axis, of the shell body 15 in the base region 25 between its upper side wall 23' and its lower side wall 23" to the height h2, measured along the z axis, of the crossmember 2 is between 2:1 and 4:1, in each case with a tolerance or a variation in the scope of the overall design of +/−25%.

As seen in reference to FIG. 4, the shield 16 also is able to have a hollow-like or channel-like recess 47. In the region of the hollow-like recess, the shield 16 bears against the bottom wall 21 of the shell body 15 and is supported against the latter. In the contact region, the bottom wall 21 and the shield 16 is able to be joined, for example is able to be joined in a materially bonded manner. This is able to be effected by way of an adhesive bond.

In principle, a transverse beam which extends in the y direction is able to be provided below the crossmember 2.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement for a vehicle, the bumper arrangement comprising:
   a crossmember;
   a crash box arranged at an end of the crossmember; and
   an end module arranged at an outer portion of the crash box, wherein the end module has a shell body, the shell body is joined to the crash box, and the end of the crossmember is joined to the shell body, wherein the shell body of the end module comprises a bottom wall by which the shell body is coupled to the crash box, and the shell body is between the crossmember and the crash box, the end module has a front portion, a transition portion, and a side portion, the front portion is arranged in front of the crash box, the end module is laterally adjoined to a front of the crash box, at a height level below the crash box, by the transition portion which transitions from the front portion into the side portion, and the transition portion extends in an arcuate or curved manner downward and in a longitudinal direction of the vehicle.

2. The bumper arrangement according to claim 1, wherein the end module further comprises a shield, and a front side of the shell body is covered by the shield at least in certain regions.

3. The bumper arrangement according to claim 1, wherein the crossmember has a strut profile that is U-shaped or hat-shaped, and a closing panel on a front side of the crossmember.

4. The bumper arrangement according to claim 3, wherein the closing panel arranged on the front side of the crossmember is shorter than the front side of the crossmember.

5. The bumper arrangement according to claim 3, wherein the end module further comprises a shield which covers or overlaps the front side of the crossmember at least in certain regions.

6. The bumper arrangement according to claim 1, wherein the shell body has a connection contour to which the end of the crossmember is connected.

7. The bumper arrangement according to claim 6, wherein the end of the crossmember at least partially engages in a form-fitting manner into the connection contour and is joined to the shell body.

8. The bumper arrangement according to claim 1, wherein the shell body has a base region arranged at a front of the crash box, and a skirt portion adjoining the base region, and the skirt portion extends outward at a height level below the crash box.

9. The bumper arrangement according to claim 1, wherein the end of the crossmember extends within the shell body at least in certain regions up to a front of the crash box.

10. The bumper arrangement according to claim 1, wherein an end side of the crash box has a stepped support contour which interacts with a counterpart support contour on the shell body.

11. The bumper arrangement according to claim 2, wherein the shell body is a hot-formed and press-hardened member, and the shield is a cold-formed member.

12. The bumper arrangement according to claim 1, wherein the shell body has a bead, a fold, or a turned-over portion in an edge-side wall portion of the shell body.

13. The bumper arrangement according to claim 5, wherein the crossmember, the strut profile, the closing panel, the shell body, and the shield are joined together by a combination of material-bond elements and form-fit elements.

14. The bumper arrangement according to claim 8, wherein a ratio of a mean vertical cross-sectional area of the shell body in the base region to a mean vertical cross-sectional area of the crash box is between 2:1 and 4:1, in each case +/−25%.

15. The bumper arrangement according to claim 8, wherein a ratio of a height, measured along a vertical axis, of the shell body in the base region between an upper side wall and a lower side wall of the shell body to a height, measured along the vertical axis, of the crossmember is between 2:1 and 4:1, in each case +/−25%.

16. The bumper arrangement according to claim 1, wherein the shell body has a tensile strength Rm greater than or equal to 1,350 MPa.

17. The bumper arrangement according to claim 8, wherein a ratio of a mean vertical cross-sectional area of the shell body in the base region to a mean vertical cross-sectional area of the crash box is 3:1+/−25%.

* * * * *